US010666516B2

(12) United States Patent
Jayaraman et al.

(10) Patent No.: US 10,666,516 B2
(45) Date of Patent: May 26, 2020

(54) CONSTRAINT-BASED VIRTUAL NETWORK FUNCTION PLACEMENT

(71) Applicant: AVAGO TECHNOLOGIES INTERNATIONAL SALES PTE. LIMITED, Singapore (SG)

(72) Inventors: Vishwanath Jayaraman, Austin, TX (US); Thomas D. Nadeau, Hampton, NH (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 62 days.

(21) Appl. No.: 15/090,024

(22) Filed: Apr. 4, 2016

(65) Prior Publication Data

US 2017/0288971 A1 Oct. 5, 2017

(51) Int. Cl.
*H04L 12/14* (2006.01)
*H04L 29/08* (2006.01)
*H04L 12/46* (2006.01)
*H04L 12/24* (2006.01)

(52) U.S. Cl.
CPC .......... *H04L 41/12* (2013.01); *H04L 12/4641* (2013.01); *H04L 67/10* (2013.01)

(58) Field of Classification Search
CPC ...... H04L 41/12; H04L 12/4641; H04L 67/10
See application file for complete search history.

(56) References Cited

U.S. PATENT DOCUMENTS

| 9,336,030 B1* | 5/2016 | Marr | G06F 9/45533 |
| 9,559,961 B1* | 1/2017 | Sorenson, III | H04L 47/125 |
| 2006/0020844 A1* | 1/2006 | Gibbons | G06F 11/1417 714/2 |

(Continued)

FOREIGN PATENT DOCUMENTS

WO WO-2015118876 A1 * 8/2015 ............. H04L 41/22

OTHER PUBLICATIONS

Verizon, "SDN-NFV Reference Architecture;" Feb. 2016, http://innovation.verizon.com/content/dam/vic/PDF/Verizon_SDN-NFV_Reference_Architecture.pdf.*

(Continued)

*Primary Examiner* — John A Follansbee
*Assistant Examiner* — Lam T Do
(74) *Attorney, Agent, or Firm* — Xsensus, LLP

(57) ABSTRACT

A network function virtualization (NFV) orchestration manager utilizes characteristics of the particular host, such as the platform itself, the hypervisor and the network interface to determine virtual network function (VNF) deployment. Exemplary platform characteristics are latency, throughput, scalability and migration. Factors are developed for each characteristic to provide positive or negative values used in the determination so that each host receives values for each characteristic. Each VNF is associated with desirable characteristics. When a VNF is to be deployed, the NVF orchestration manager determines the host factors relevant to the VNF. After analyzing the hosts and comparing them to the VNF requirements, a host choice is determined and the VNF is deployed to that host, with a virtual machine (VM) being created if needed. In a similar manner, VNFs can be chosen for inclusion in a service function chain (SFC).

18 Claims, 11 Drawing Sheets

(56) References Cited

U.S. PATENT DOCUMENTS

| | | | | |
|---|---|---|---|---|
| 2008/0168436 | A1* | 7/2008 | Shwartz | G06F 8/61 717/174 |
| 2013/0073730 | A1* | 3/2013 | Hansson | G06F 9/5044 709/226 |
| 2014/0058871 | A1* | 2/2014 | Marr | G06F 9/45533 705/26.1 |
| 2015/0082308 | A1* | 3/2015 | Kiess | G06F 9/5072 718/1 |
| 2015/0124622 | A1* | 5/2015 | Kovvali | H04W 28/0215 370/236 |
| 2015/0244569 | A1* | 8/2015 | Puimedion | H04L 41/0803 709/220 |
| 2015/0288767 | A1* | 10/2015 | Fargano | H04L 43/08 709/227 |
| 2015/0370582 | A1* | 12/2015 | Kinsella | G06F 9/545 718/1 |
| 2016/0078342 | A1 | 3/2016 | Tang | |
| 2016/0092259 | A1* | 3/2016 | Mehta | G06F 9/45558 718/1 |
| 2016/0261495 | A1† | 9/2016 | Xia et al. | |
| 2017/0078216 | A1* | 3/2017 | Adolph | H04L 12/4641 |
| 2017/0104847 | A1* | 4/2017 | Zhang | H04L 67/327 |
| 2017/0116021 | A1* | 4/2017 | Miller | G06F 9/45558 |
| 2017/0230733 | A1† | 8/2017 | Rana et al. | |
| 2017/0279668 | A1* | 9/2017 | Shevenell | H04L 41/0677 |
| 2017/0279672 | A1* | 9/2017 | Krishnan | H04L 41/0803 |

OTHER PUBLICATIONS

QLogic, "SR-IOV Improves Server Virtualization Performance;" 2015, https://web.archive.org/web/20150418082638/http://www.qlogic.com/Resources/Documents/WhitePapers/Adapters/WP_SR-IOV_Improves_Server_Virtualization_Performance.pdf.*

Ruparel, Chandreh, "Delivering NFV Data Plane Applications with COTS Platforms;" Jul. 24, 2014, https://www.sdxcentral.com/articles/contributed/delivering-nfv-data-plane-applications-cots-platforms-chandresh-ruparel/2014/07/.*

Hajnoczi, Stefan, "QEMU Internals: vhost architecture;" Sep. 7, 2011, http://blog.vmsplice.net/2011/09/qemu-internals-vhost-architecture.html.*

Cisco, "Chapter 7 10 Gigabit Ethernet Connectivity with Microsoft Windows Servers;" 2010, https://www.cisco.com/c/dam/en/us/products/collateral/switches/nexus-7000-series-switches/C07-572828-00_10Gb_Conn_Win_DG.pdf.*

Vugt, Sander van, "Enabling Huge Pages is a Small Step that can make a Big Difference;" Jan. 16, 2014, https://web.archive.org/web/20140116050524/http://searchservervirtualization.techtarget.com/tip/Enabling-huge-pages-is-a-small-step-that-can-make-a-big-difference.*

Leandecisions, "How to Create an Effecitve Weighted Pro-Con List," Sep. 25, 2012, http://leandecisions.com/2012/09/how-to-create-an-effective-weighted-pro-con-list.html (Year: 2012).*

PCT Int'l Search Report & Written Opinion filed in copending PCT Application No. PCT/US2017/025146 dated Jul. 17, 2017, 13 pages.

"Scalable architecture for service function chain orchestration"; Software Defined Networks (EWSDN); 2015 Fourth European Workshop on. IEEE; Sep. 30-Oct. 2, 2015; Retrieved from the Internet: <URL: https://biblio.ugent.be/publication/7009526/file/7009545> Sahhaf, Sahel, et al. Oct. 2, 2015.

"Virtual network functions placement and routing optimization"; Cloud Networking (CloudNet); 2015 IEEE 4th International Conference on. IEEE; Oct. 5-7, 2015; Retrieved from the Internet: <URL: https://www.researchgate.net/profile/S_Secci/publication/279830379_Virtual_Network_Functions_Placement_and_Routing_Optimization/links/5626144208aed3d3f137e46d.pdf> Addis, Bernardetta, et al. Oct. 7, 2015.

* cited by examiner
† cited by third party

Sample Platform Characteristics
Low Latency factors = {NUMA nodes, Hyper Threading Disabled}
High Throughput factors = { Dedicated CPU}
Scalability factors = {SR-IOV}
Migration factors = {SR-IOV}

— 402

Sample Hypervisor/OS characteristics
Low Latency factors ={vHost-net, SR-IOV}
High Throughput Factors = {Huge Pages, PCI Pass-through card, DPDK, SR-IOV}
Scalability factors = {SR-IOV}
Migration factors = {SR-IOV, QEMU}, negative factor {PCI Pass-through card}

— 404

Sample Network characteristics
High Throughput Factors = {High Speed NICs, NIC bonding}
Scalability factors = {SR-IOV NICs}

| Host A | | |
|---|---|---|
| Platform Characteristics | | |
| NUMA Topology | + | L |
| Hyper Threading DISABLED | + | L |
| Dedicated CPU | 0 | T |
| SR-IOV | + | S,M |
| Hypervisor Characteristics | | |
| Huge Pages | 0 | T |
| SR-IOV | + | S,M |
| vHost-net | 0 | L |
| PCI Passthrough card | 0 | T,M |
| DPDK | 0 | T |
| QEMU | 0 | M |
| Network characteristics | | |
| 10 GB SR-IOV card | + | S |
| High Speed NICs | 0 | T |
| NIC bonding | 0 | T |
| L | 3 | |
| T | 0 | |
| S | 3 | |
| M | 2 | |

— 408

| Host B | | |
|---|---|---|
| Platform Characteristics | | |
| NUMA Topology | + | L |
| Hyper Threading DISABLED | 0 | L |
| Dedicated CPU | + | T |
| SR-IOV | 0 | S,M |
| Hypervisor Characteristics | | |
| Huge Pages | 0 | T |
| SR-IOV | 0 | S,M |
| vHost-net | 0 | L |
| PCI Passthrough card | +,- | T,M |
| DPDK | 0 | T |
| QEMU | 0 | M |
| Network characteristics | | |
| 10 GB SR-IOV card | 0 | S |
| High Speed NICs | 0 | T |
| NIC bonding | 0 | T |
| L | 1 | |
| T | 2 | |
| S | 0 | |
| M | -1 | |

— 410

| Host C | | |
|---|---|---|
| Platform Characteristics | | |
| NUMA Topology | 0 | L |
| Hyper Threading DISABLED | 0 | L |
| Dedicated CPU | 0 | T |
| SR-IOV | + | S,M |
| Hypervisor Characteristics | | |
| Huge Pages | + | T |
| SR-IOV | + | S,M |
| vHost-net | 0 | L |
| PCI Passthrough card | 0 | T,M |
| DPDK | 0 | T |
| QEMU | 0 | M |
| Network characteristics | | |
| 10 GB SR-IOV card | + | S |
| High Speed NICs | 0 | T |
| NIC bonding | 0 | T |
| L | 0 | |
| T | 1 | |
| S | 3 | |
| M | 2 | |

Service Chain 1 — 614

| Service Type | Optimization Factor | Selected VNF |
|---|---|---|
| B | Latency | VNF3_B |
| A | Migration Latency Throughput | VNF1_A |
| D | Scalability | VNF6_D |

Service Chain 2 — 616

| Service Type | Optimization Factor | Selected VNF |
|---|---|---|
| B | Latency | VNF3_B |
| A | Latency Throughput | VNF2_A |
| D | Scalability Migration | VNF5_D |
| C | Scalability | VNF4_C |

CONSTRAINT-BASED VIRTUAL NETWORK FUNCTION PLACEMENT

BACKGROUND OF THE INVENTION

1. Field of the Invention

The invention relates to networking, and more particularly, to the placement of virtual network function instances in a software defined network environment.

2. Description of the Related Art

Modern telecommunication networks are very complex and very difficult to configure and maintain. One of the recent advantage improvements has been the development of software defined networking (SDN) where a central controller provides routing management capability and provides routing instructions to the various switches which form the network. Another recent improvement is virtualized network functions (VNF) or network function virtualization (NFV). It has been conventional that various network functions such as routing, firewalls and the like have been performed by dedicated appliances in the network. However, those appliances are both expensive and must be carefully placed in specific locations to perform properly. With the advent of very powerful host or server computers and virtual machines operating on those hosts, it is now possible to take the underlying functions, such as firewalls or routers, and place the logic in a virtual machine. Because the servers are commodity products, the high cost of the appliances is removed. Further, because the function is simply a virtual machine located on a server, the actual location of the particular network function becomes extremely flexible. When combined with SDN the entire network then can be highly optimized to provide the desired functions in the most appropriate places.

European Telecommunications Standards Institute (ETSI) has developed a model of network function virtualization in combination with software defined networking. In that terminology the NFV infrastructure (NFVI) is the host(s) running the hypervisor and the virtual machines (VMs) and/or containers, with the relevant processor, storage and network capabilities. In this description, the term VM is used to mean both virtual machines and containers, the two being understood by one skilled in the art as being similar entities for the purposes of this discussion. The virtualized network functions execute on top of or are deployed to the NFVI. To control the network, a management and organization (MANO) module is present. The MANO module has three subcomponents: a virtualized infrastructure manager, effectively the VM manager; VNF managers, the managers which control the deployment and execution of the various VNFs; and an NFV orchestration manager which oversees the deployment of the virtual network functions on the appropriate virtual machines and interacts with the SDN controllers to provide proper routing and service chaining.

However, actually determining the most appropriate place for particular network function is a very complicated proposition. Preliminary efforts have been made to develop an NFV orchestration manager but those efforts have been only marginally successful and a great deal of improvement is necessary to allow widespread adoption of the combination of NFV and SDN, and thus more efficient networks.

SUMMARY OF THE PRESENT INVENTION

Embodiments of NFV orchestration managers according to the present invention provide highly automated and greatly improved deployment and removal of VNF's. An NFV orchestration manager operating according to the present invention utilizes characteristics of the particular host, such as the platform itself, the hypervisor and the network interface to determine deployment or removal.

Exemplary platform characteristics are latency, throughput, scalability and migration. Exemplary latency factors are non-uniform memory access (NUMA) nodes and hyperthreading being disabled on the processor. An exemplary high throughput factor is a dedicated CPU. An exemplary scalability factor is the presence of a single root I/O virtualization (SR-IOV) network interface card (NIC). A migration factor is again the presence of an SR-IOV NIC.

Exemplary hypervisor characteristics are again low latency, high throughput, scalability and migration. Exemplary low latency factors include the use of vhost-net and an SR-IOV NIC. Exemplary high throughput factors include huge pages, a PCI pass-through card, the use of Data Plane Development Kit (DPDK), the use of the Quick Emulator (QEMU) and the presence of an SR-IOV NIC. A preferred scalability factor is the presence of an SR-IOV NIC. For migration, positive factors are an SR-IOV NIC and QEMU while a negative factor is the existence of a PCI pass-through card.

Network characteristics will generally include high throughput and scalability. The examples of high throughput factors are a high-speed NIC (such as 25 Gbps, 40 Gbps, 50 Gbps or 100 Gbps) and NIC bonding. An exemplary scalability factor is an SR-IOV NIC. There are no latency or migration factors relevant to the network.

For each host instance a table is developed that includes values for the various factors that relate to that host, the platform characteristics, the hypervisor characteristics and the network characteristics. By analyzing the above factors, properties values for the particular host can be developed. Similarly, each VNF is associated with desirable characteristics.

The NVF orchestration manager is in communication with a VM manager and a VNF manager to understand the capabilities and loadings of any particular host and to determine availability of resources on that particular host. When a new VNF is to be deployed, the NVF orchestration manager determines the factors relevant to the VNF and analyzes the particular hosts that have available capacity. After analyzing the hosts and comparing them to the VNF requirements, a host choice is determined and the VNF is deployed to that host, with a VM being created if needed.

Therefore, by providing factors relating to the platform, the hypervisor and the network and then determining relevant factors to a VNF, the NVF orchestration manager according to the present invention can readily and optimally deploy VNFs to perform network operations.

In a similar manner, VNFs can be chosen for inclusion in a service function chain (SFC). The various functions desired in the chain are specified and then for any case where there are at least two VNFs in the NVFI, desired optimization factors are specified and compared against the underlying hosts of the VNFs to select a particular VNF. The selected VNFs are provided to a constrained shortest path first (CSPF) module to determine the specific path for the SFC. The determined SFC is then provided to the SDN controller for installation.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 4A is an illustration of platform, hypervisor and network characteristics and characteristics of exemplary hosts.

FIG. 6B is the application of the flowchart of FIG. 5 to the VNFs of FIG. 6A.

DETAILED DESCRIPTION OF THE PRESENT INVENTION

Figure 1:
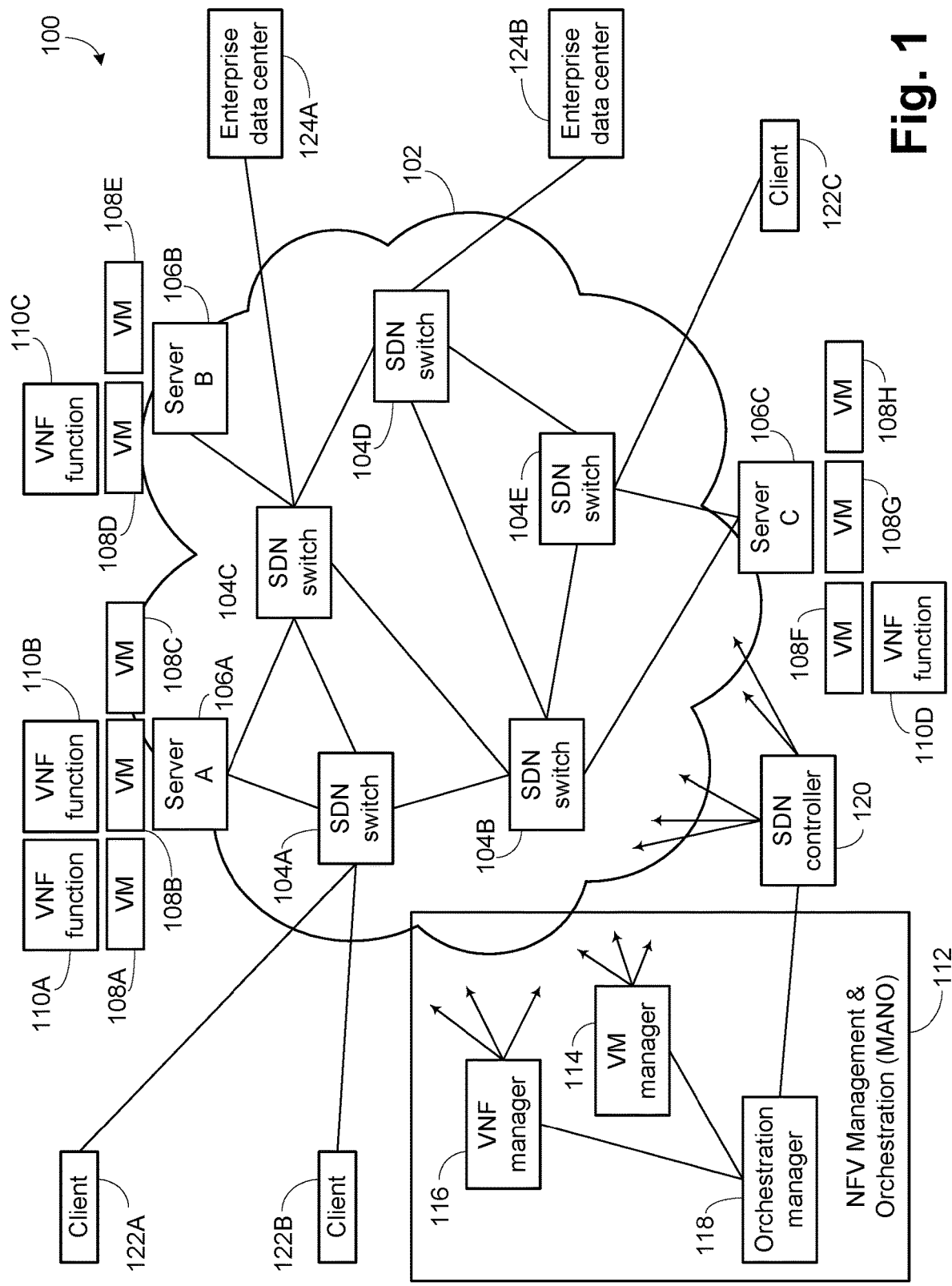
FIG. 1 is a block diagram of a network according to the present invention.

Referring now to FIG. 1, an exemplary network 100 according to the present invention is illustrated. The illustrated network is very simple for purposes of explanation, it being understood that most networks utilizing SDN and NFV are much more complex. Further, the illustrated network is just one configuration and numerous others can be developed and operated according to the present invention. A network cloud 102 is formed by a series of SDN switches 104A-104E. Various SDN switches 104A-104E are interconnected to allow flow of packets throughout the network 100. A host A 106A is connected to SDN switches 104A and 104C in the example. Host A 106A includes, as illustrated, three virtual machines 108A, 108B and 108C. A VNF 110A is present executing in the VM 108A, while a VNF 110B is executing in the VM 108B. No VNF function is executing in the VM 108C, allowing capacity for an additional VNF to be located in the host a 106. A host B 106B is connected to SDN switch 104C and includes VMs 108D and 108E, with VM 108D executing VNF 110C. Host C 106C is connected to SDN switches 104B and 104E. The host C 106C includes three virtual machines 108F, 108G and 108H, with only VM 108F including a VNF 110D. The hosts 106A-106C are conventional commodity servers which can execute a large number of VMs much less expensively than using dedicated appliances as in the past.

An NVF management and organization (MANO) block 112 is present in the network 100. The NVF MANO 112 includes a VM manager 114, a VNF manager 116 and an NVF orchestration manager 118. The VM manager 114 is connected to the various hosts 106A-106E to control the VMs 108A-108H present on those hosts 106A-106C. The VNF manager 116 is also connected to the hosts 106A-106C to allow deployment and control of VNF functions to the various hosts 106A-106C. The orchestration manager 118 is connected to the VM manager 114, the VNF manager 116 and an SDN controller 120. The SDN controller 120 is connected to each of the SDN switches 104A-104E to control operations and routing of the particular switches 104A-104E. The SDN controller 120 further provides service function chaining information as defined by ETSI to the particular SDN switches 104A-104E, if used, to allow proper use of the various VNF's installed on the various hosts 106A-106C. The orchestration manager 118 coordinates the deployment and removal of the VNF's, the instantiation of the VMs and the routing by communicating appropriately with the VM manager 114, the VNF manager 116 and the SDN controller 120. The VM manager 114, a VNF manager 116, an NVF orchestration manager 118 and the SDN controller 120 are typically personal computers or servers, much as the hosts are commodity servers. Various clients 122A, 122B and 122C are connected to the network 100 so that the packets can flow from the clients 122A-122C to exemplary enterprise data centers 124A, 124B.

Figure 2A:
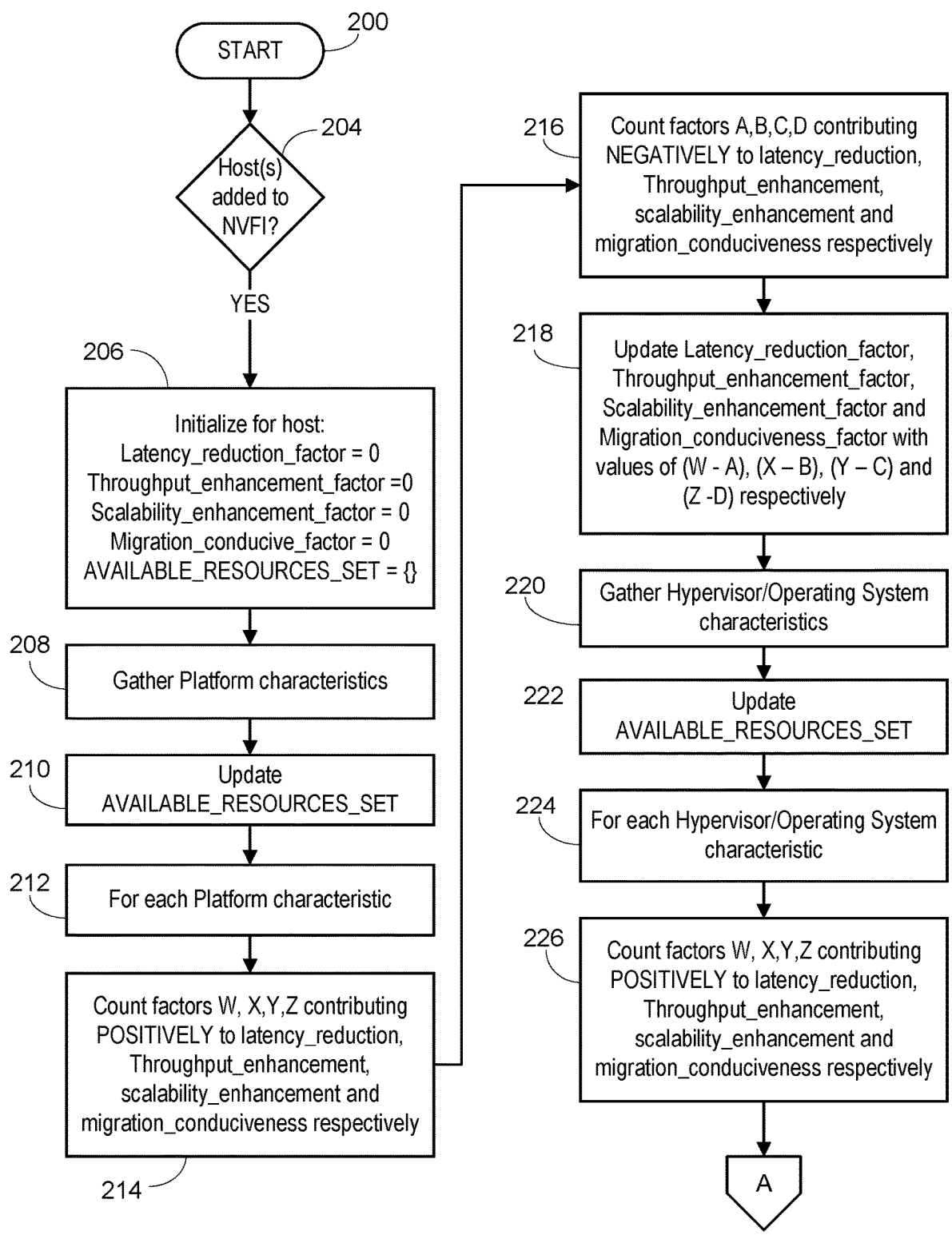
FIGS. 2A and 2B are a flowchart of operations for adding a host to the infrastructure according to the present invention.
Figure 2B:
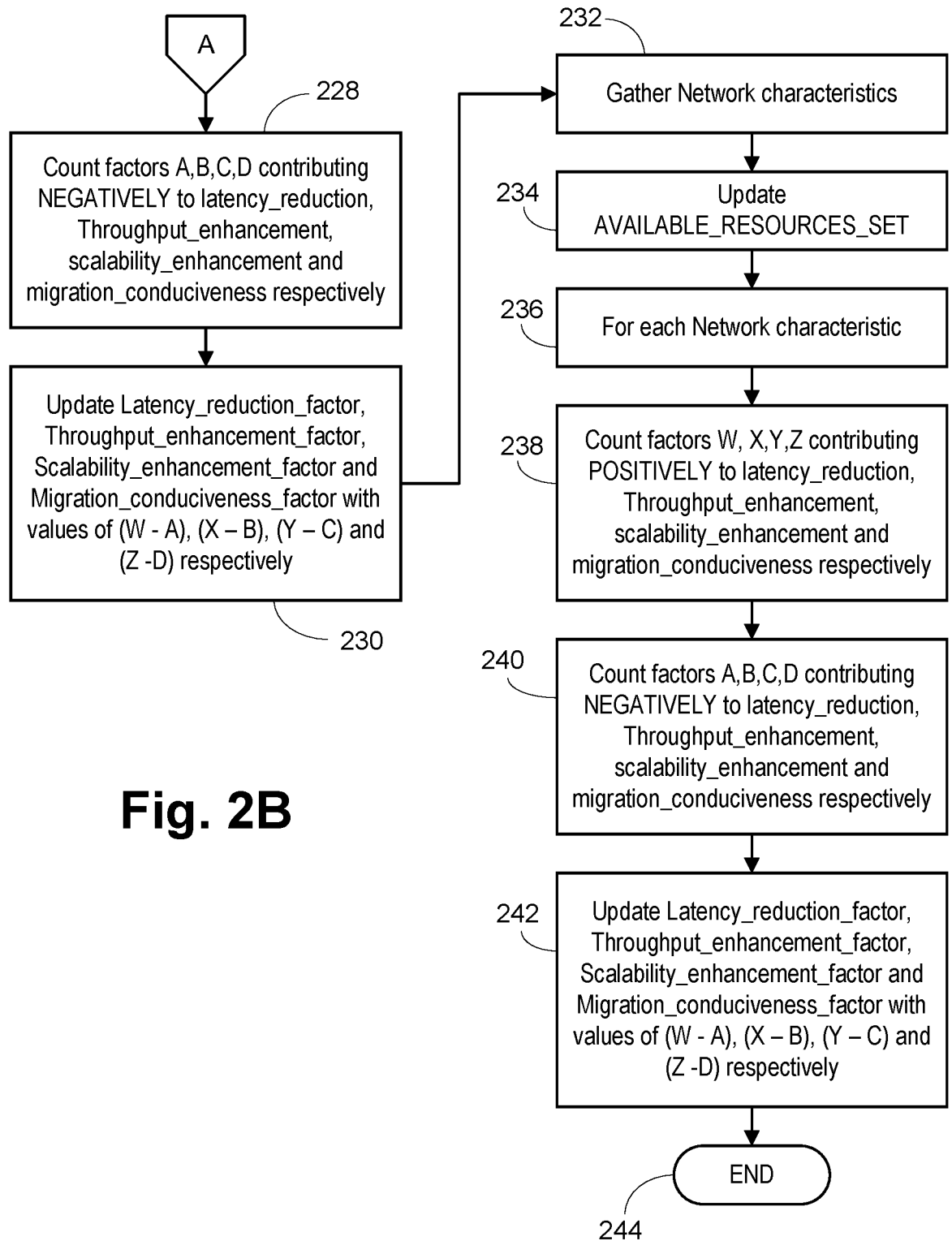

FIGS. 2A and 2B are a flowchart of operations performed by the NFV orchestration manager 118 when a host is added to the network 100. Operation commences at step 200 and at step 204 a determination is made as to whether a new host is being added to the NFVI or network 100. If so, the orchestration manager 118 in step 206 initializes a table containing entries for latency reduction factor, throughput enhancement factor, scalability enhancement factor, and migration conducive factor with all initial values and available resources set to a value which is no or empty. In step 208 the orchestration manager 118 gathers the platform or hardware characteristics of the particular host. In step 210 these characteristics are provided to update an AVAILABLE_RESOURCES_SET entry for that host in a global database. The AVAILABLE_RESOURCES_SET entry maintains the host characteristics and maintains loading or utilization information on the host.

In the preferred embodiment, the various characteristics determined are those needed to determine the factors used for VNF placement. Exemplary platform characteristics are latency, throughput, scalability and migration. It is understood that these are exemplary characteristics and other characteristics can be used as desired and as appropriate for the environment. Exemplary latency factors are non-uniform memory access (NUMA) nodes and hyperthreading being disabled on the processor. An exemplary high throughput factor is a dedicated CPU. An exemplary scalability factor is the presence of an SR-IOV NIC. A migration factor is again the presence of an SR-IOV NIC. It is understood that these are exemplary factors and other parties could add additional factors or delete some of these factors and still be operating according to the present invention.

Step 212 begins the review process for each platform characteristic. In step 214 the platform characteristics are reviewed to determine the count or presence of factors which contribute positively to latency reduction, high throughput enhancement, scalability enhancement and migration conduciveness. An example is provided below to better explain the operation. In step 216 a count is made of the factors that contribute negatively to latency reduction, throughput enhancement, scalability enhancement and migration conduciveness. In step 218 the previously initialized factor values are updated to include the difference between the positive values determined in 214 and the negative values determined in step 216 for each particular factor.

In step 220 the orchestration manager 118 gathers the hypervisor and operating for operating system characteristics for the particular host. Exemplary hypervisor characteristics are low latency, high throughput, scalability and migration. Exemplary low latency factors include the use of vhost-net and an SR-IOV NIC. Exemplary high throughput factors include huge pages, a PCI pass-through card, the use of Data Plane Development Kit (DPDK), the use of the Quick Emulator (QEMU) and the presence of an SR-IOV NIC. A preferred scalability factor is the presence of an SR-IOV NIC. For migration, positive factors are an SR-IOV NIC and QEMU, while a negative factor is the existence of a PCI pass-through card. It is understood that these are exemplary factors and other parties could add additional factors or delete some of these factors and still be operating according to the present invention.

These characteristics are added to the AVAILABLE_RE-SOURCES_SET entry in step 222. Step 224 begins the hypervisor/operating system characteristics analysis. In step 226 the characteristics are reviewed to count the factors that contribute positively to latency reduction, throughput enhancement, scalability enhancement and migration conduciveness. In step 228 the characteristics are reviewed for negative factors for latency reduction, throughput enhancement, scalability enhancement and migration conduciveness. In step 230 the hypervisor factors determined in step 226 and step 228 are applied to the factor values previously determined in step 218 to provide an ongoing development of the overall factor values for the host.

In step 232 the orchestration manager 118 gathers the network characteristics of the particular host. Network characteristics will generally include high throughput and scalability. The examples of high throughput factors are a high-speed NIC (such as 25 Gbps, 40 Gbps, 50 Gbps or 100 Gbps) and NIC bonding. An exemplary scalability factor is an SR-IOV NIC. There are no latency or migration factors relevant to the network in the preferred embodiment. It is understood that these are exemplary factors and other parties could add additional factors or delete some of these factors and still be operating according to the present invention.

In step 234 the AVAILABLE_RESOURCES_SET entry is updated with these values. Step 236 commences the analysis of the characteristics of the network. In step 238 the characteristics are analyzed for positive factors relating to latency reduction throughput reduction, scalability enhancement and migration conduciveness. In step 240 the network characteristics are evaluated to count the factors contributing negatively to latency reduction, throughput enhancement, scalability enhancement and migration conduciveness. In step 242 the values determined in steps 238 and 240 are applied to update the factors that were developed in step 230. The end result after the operation of step 242 is latency reduction, throughput enhancement, scalability enhancement and migration conduciveness factor values for the particular host which has been added. Operation for this addition of a host ends in step 244.

Figure 3A:
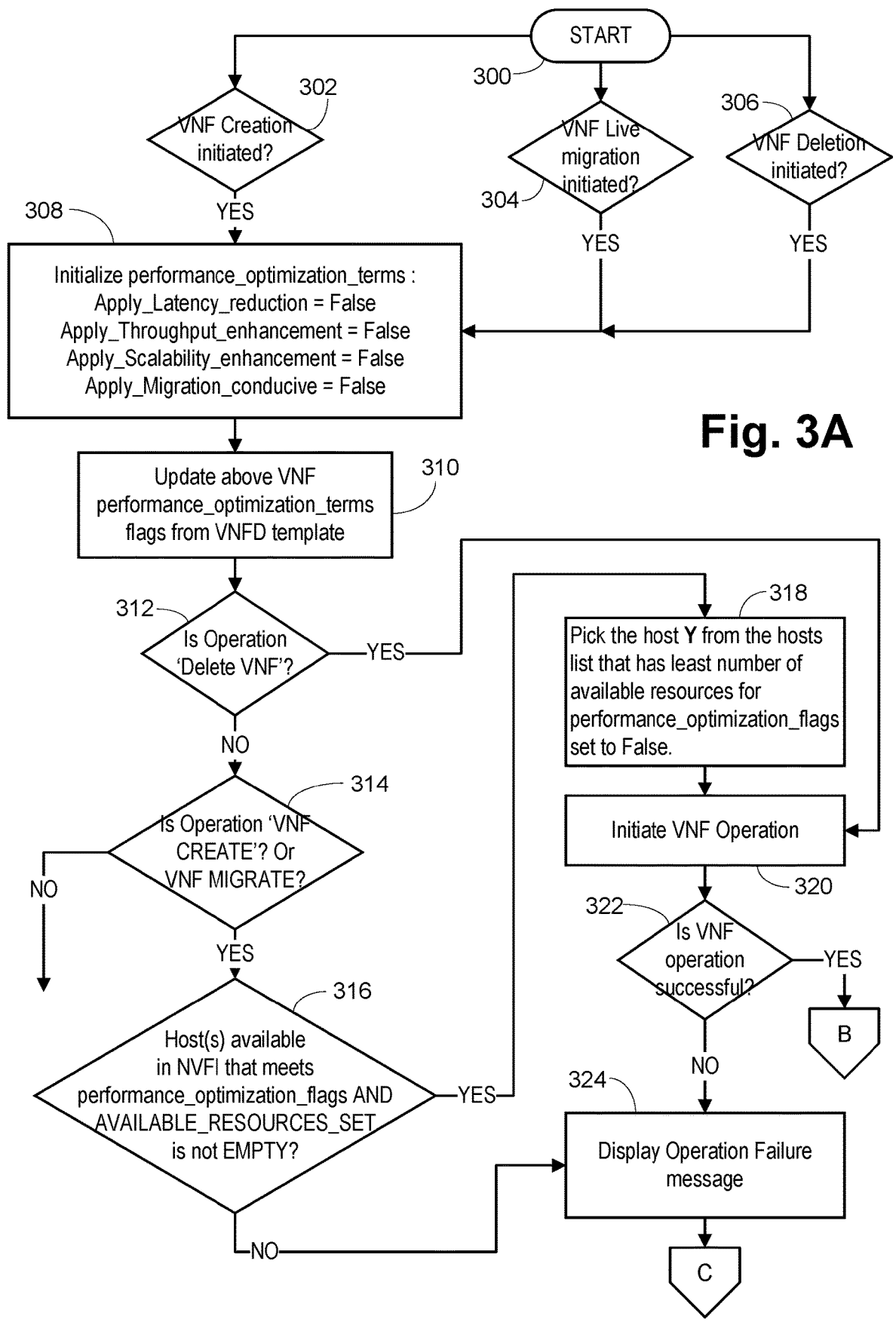
FIGS. 3A and 3B are a flowchart illustrating deployment of VNF according to the present invention.

Referring to FIG. 3A, operation commences in step 300, determining if a VNF is to be created in step 302, to be migrated in step 304, or to be deleted or removed in step 306. In step 308 the characteristic analysis for VNF operation is set to have all of the characteristic values at false or zero. In step 310 the orchestration manager 118 retrieves the VNF optimization factors from a template which has previously been created and provided when the VNF was installed in the VNF manager 116 for later deployment. The VNF optimization characteristics indicate which of the four values, latency reduction, throughput enhancement, scalability enhancement or migration conduciveness, are relevant to the operations of the particular VNF. Any true or positive values retrieved from the template are applied to the table for this VNF instance. In step 312 it is determined if the VNF is being deleted. If not, in step 314 it is determined if the VNF is being created or migrated. If so, in step 316 the orchestration manager 118 determines the particular hosts that are available in the NVFI, the network, that meet the optimization requirements for the VNF and that have AVAILABLE_RESOURCES_SET entries that indicate the host has the capacity to receive the VNF, i.e. the hosts reserves are not EMPTY. In step 318 a particular host from the series of hosts that have been determined in step 316 is selected by choosing the one that has the least number of available resources for appropriate optimization terms that are set to false, that is, the host that has the least available resources not of interest to this particular VNF is selected. This attempts to fully utilize the hosts before an additional host is needed and keeps host that meet the most performance characteristics available to meet later VNF deployments that could require most performance characteristics. In step 320 in the case of a creation of a VNF, the orchestration manager 118 instructs the VNF manager 116 to deploy the VNF and start its operation. This operation may involve the orchestration manager 118 directing the VM manager 114 to initiate a VM on the relevant host before the VNF is actually deployed. In the case of a migration, the orchestration manager 118 instructs the VM manager 114 to migrate the VM containing the VNF to the new location and informs the VNF manager 116 of the migration to allow the VNF manager 116 to maintain an accurate record of the VNF deployments. In step 322 it is determined if the VNF deployment or migration operation was successful. If not or if the determination in step 316 indicated that there is no particular host available to meet the parameters, then in step 324 a failure message is provided to the administrator to allow corrective action to be taken if necessary. Corrective actions could include addition of a host to the NVFI, use of a different VNF that has different characteristic requirements, and so on.

If the operation in step 312 was determined to be delete the VNF, then control proceeds to step 320 to delete the VNF. The orchestration manager 118 instructs the VNF manager 116 to shut down the indicated VNF. The orchestration manager may also instruct the VM manager 114 to shut down the VM after the VNF is removed. If the VNF creation, migration or deletion operation was successful as determined in step 322, in step 326 a determination is made whether it is a creation or a migration that was requested. If it is one of those two operations, than in step 328 the orchestration manager 118 removes the used resources from the AVAILABLE_RESOURCES_SET entry of the host, reflecting the addition of the VNF, and potentially a VM. In step 330 it is determined if the operation is a migrate or delete. If so, in step 332 the AVAILABLE_RESOURCES_SET entries for the particular hosts are updated to indicate the availability of the additional resources that have been released by the deletion or migration of the VNF on that particular host. If not a migrate or delete in step 330 or after step 332, in step 334 an operation success message is provided to the administrator.

Figure 4B:
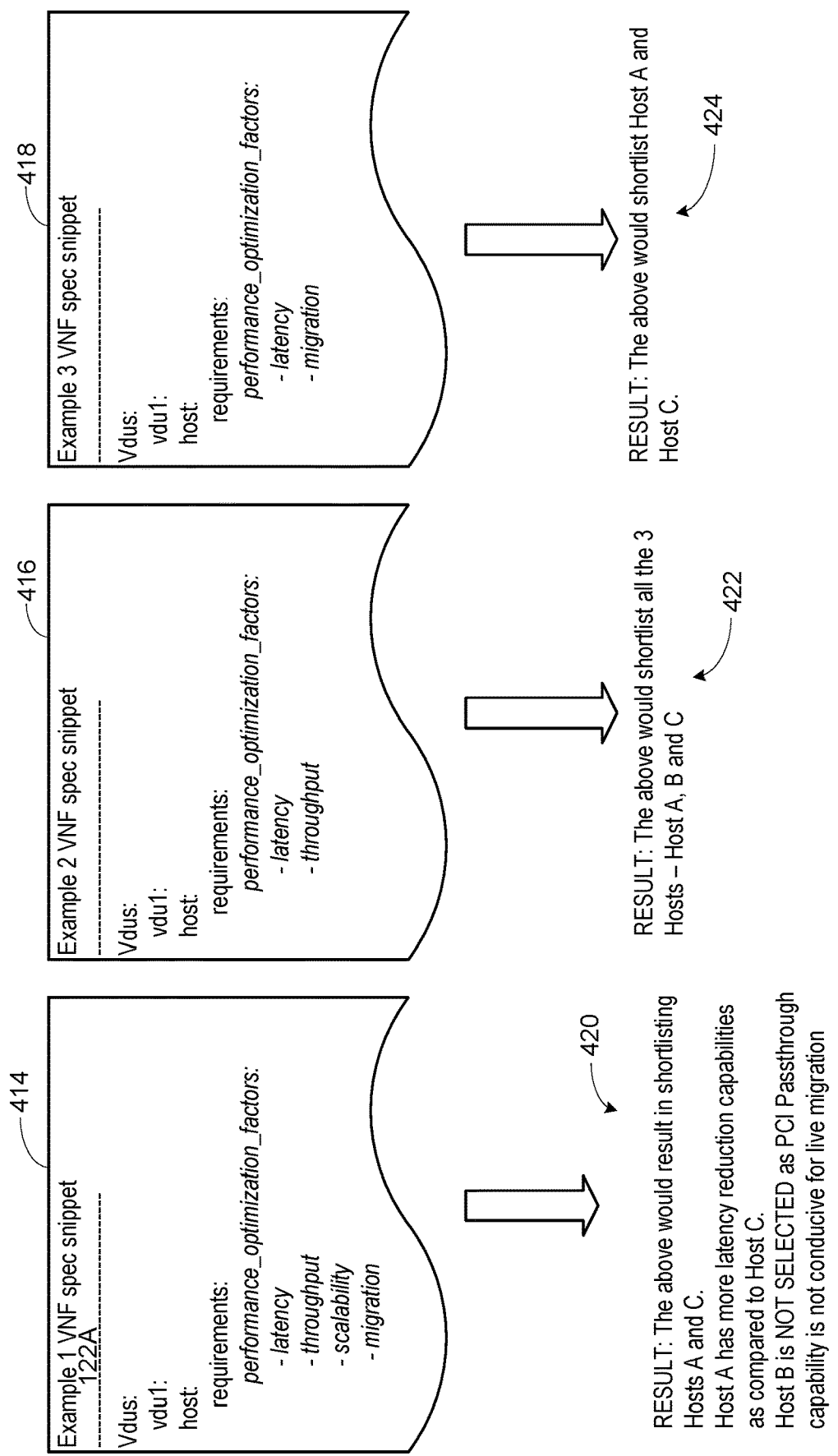
FIG. 4B is the application of the operations of FIGS. 3A and 3B for exemplary VNFs, with indications of the resulting potential hosts of FIG. 4A.

FIGS. 4A and 4B provide illustrations of specific examples of various factors that are relevant to the management of the VNFs and the application of the above described operations in one particular host environment and for three particular VNF's. Table 402 lists exemplary platform characteristics according to the present invention. Low latency positive factors are the processor being NUMA and that hyperthreading has been disabled. For a high throughput factor, a dedicated CPU is indicated as being a positive factor. Scalability and migration factors are both the presence of an SR-IOV NIC.

Table 404 indicates sample hypervisor/operating system characteristics. Low latency factors include the presence of vhost.net operation and an SR-IOV NIC. High throughput enhancement factors include huge pages, a PCI pass-through card, DPDK being performed and the presence of an SR-IOV NIC. The exemplary scalability factor is the presence of an SR-IOV NIC. Migration enhancement factors include the presence of an SR-IOV NIC and QEMU operation. Table 404 indicates that the presence of a PCI pass-through card is a negative factor for migration for the hypervisor.

Table 406 is the exemplary network characteristic factors. High throughput factors include the presence of high-speed NIC and the capability to do NIC bonding. The example scalability factor is the presence of an SR-IOV NIC.

For this illustration of operation, three different configurations of hosts are considered. Host A, such as host A 106A, uses a NUMA topology and has hyperthreading DISABLED. The CPUs are dedicated and a 10 Gbps SR-IOV NIC is present. In addition, vhost-net operation is present. For Host B, such as host B 106B, the processors are NUMA Topology and hyperthreading is ENABLED. The CPUs are dedicated and there is a PCI passthrough card installed. For Host C, such as host C 106C, the CPUs are not NUMA topology and hyperthreading is enabled. Huge pages are configured and a 10 Gbps SR-IOV NIC is installed.

Table 408 illustrates the application of the particular configuration of host A in Table 402 to the total list of factors considered for each of platform, hypervisor and network and provides the final count or total for each characteristic, such as low latency, high throughput, scalability and migration. In this example host A is NUMA topology and has hyperthreading disabled, so positive indications are noted under the latency or L reference. This is an example of CPUs that are not dedicated, so there is a zero value next to the T for high throughput. The host A in the example includes an SR-IOV NIC, so there is a plus next to the S for scalability and M for migration values. Under hypervisor characteristics, because of the SR-IOV NIC present there is a plus next to S and M. The host A does use vhost.net and therefore there is a plus next to L for latency. As the host A does not use huge pages, have a PCI passthrough card, or use DPDK or QEMU, those factors receive zero values next to the respective characteristic. In network characteristics the presence of an SR-IOV card is noted as a plus. All of the other indicated factors are zero, which means there are no negative values present for host A. At the bottom of table 408 are to totals of 3 for latency, 0 for throughput, 3 for scalability and 2 for migration. It is understood that the format of table 408 is exemplary and numerous other ways of maintaining the data are possible.

Table 410 provides values for exemplary host B. Host B does have NUMA CPUs and they are dedicated, so on platform characteristics there are pluses next to latency and throughput. Host B includes a PCI pass-through card so under hypervisor characteristics there is a plus for throughput but a negative factor for migration. In general, in the preferred embodiment, if a given factor is not present, then a zero value is used for that factor. As shown by the PCI passthrough for host B and hypervisor characteristic of migration, when a factor having a negative value is present, then a negative is used. The remaining values for host B are zero. The totals for host B are 1 for latency, 2 for throughput, 0 for scalability and −1 for migration.

Table 412 provides the factors for host C. Host C includes an SR-IOV NIC and the hypervisor uses huge pages, so under platform characteristics there is a plus next to SR-IOV NIC for scalability and migration, under hypervisor characteristics there is a plus next to huge pages for throughput, a plus next to SR-IOV NIC for scalability and a minus for migration. Under network characteristics the presence of the SR-IOV NIC provides a plus for scalability. The totals for host C are 0 for latency, 1 for throughput, 3 for scabiliy and 2 for migration.

Figure 3B:
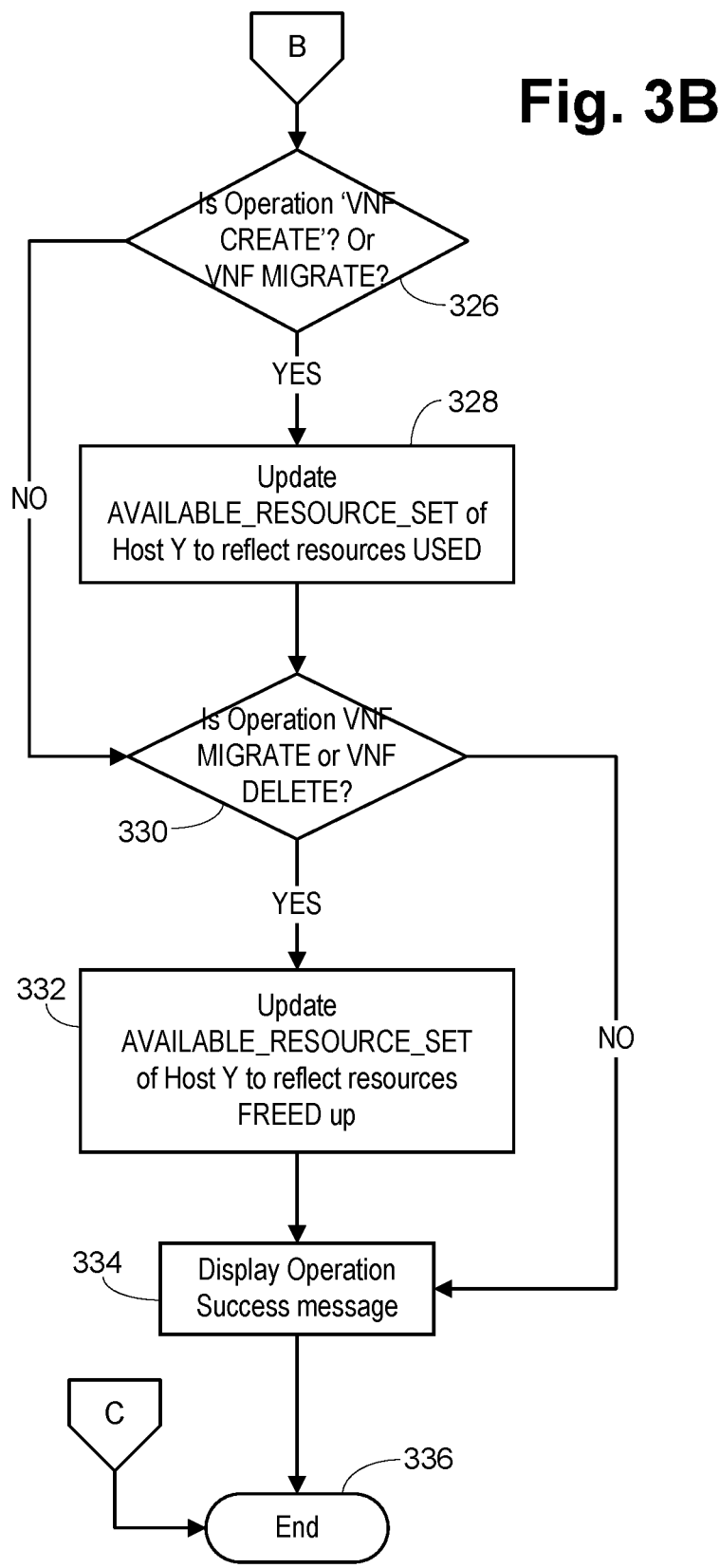

Table 414 indicates the optimization factors for the first exemplary VNF. In this case all four performance optimization factors are desired, latency, high throughput, scalability and migration. Reviewing the operation of the flowchart of FIGS. 3A and 3B for the hosts provided in FIG. 4A in tables 408, 410 and 412 with the VNF shown in table 414, results in the indication 420 that hosts A and C would be acceptable and host B is not acceptable and not selected because of the negative factor of the PCI pass-through card on migration. As no optimization flags are set to false, all being selected, the selection between hosts A and C would be done on other factors, such as the higher sum of values (8 for host A and 6 for host C); overall available remaining capacity on the host, lesser being preferred; better routing placement between the expected clients and data centers, better fit into a service function chain if the new VNF is being added to an existing service function chain, and so on. Assuming overall remaining capacity is used, reviewing host A 106A and host C 106C, host A 106A has two VNFs executing and host C 106C has only one VNF executing. Therefore, assuming equivalent hosts in areas other than indicated above, host A would have fewer available resources and therefore would be chosen from between host A and host C.

Table 416 shows the requirements for example 2 VNF. In table 416 only latency and throughput are required optimization factors for the particular VNF. With those values, all three of the hosts host A, host B and host C would be acceptable solutions 422 to the placement of the VNF as all of the hosts have positive values for latency and throughput. Per step 318, both scalability and migration are false as only latency and throughput are relevant for this VNF. Both hosts A and C have an equal value of five for the sum of the scalability and migration values, so again secondary criteria as discussed above would be used to select a host from the two.

Table 418 is a third example VNF. In this example latency and migration are the optimization factors. As noted under table 414, host B would not be selected because of the negative factor of the PCI pass-through card, otherwise hosts A and C are both positive and therefore would be available for selection 424. Looking at the values for throughput and scalability, host A sums to 3 and host C sums to 4, so host A would; be chosen.

Figure 5:
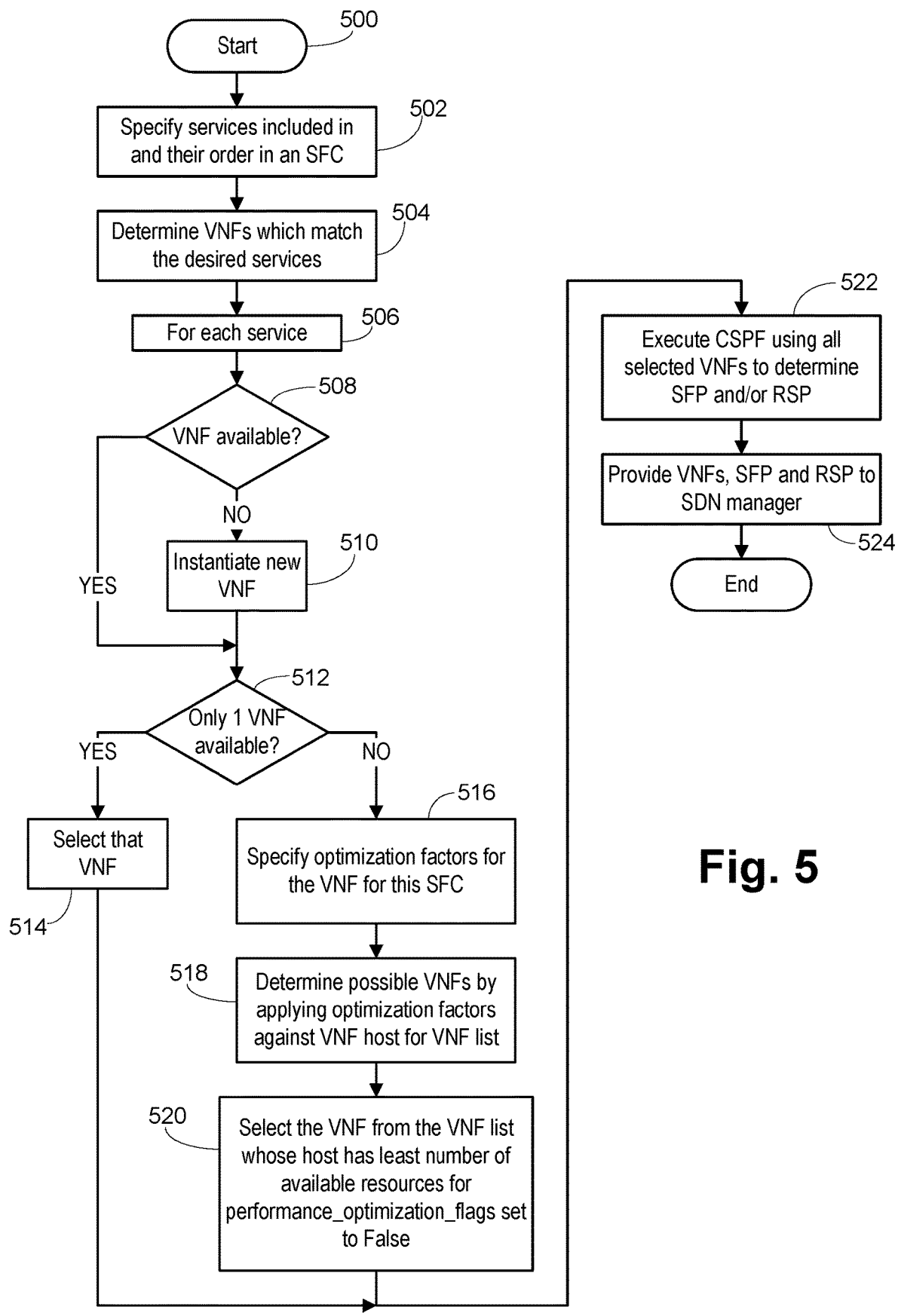
FIG. 5 is a flowchart illustrating selection of VNFs for an SFC and development of the SFC according to the present invention.

FIG. 5 is a flowchart of operation according to the present invention when selecting VNFs for inclusion in a service function chain (SFC). The operation begins at step 500. In step 502 the administrator specifies the services to be included in the SFC and the order of those services in the SFC. In step 504 the orchestration manager 118 determines the VNFs in the NFVI that match the desired services. In step 506 selection of the VNF for each service is started. In step 508 it is determined if a VNF is even available. If not, in step 510 a new VNF is instantiated, preferably according to FIGS. 3A and 3B. If a VNF is available or after creation of the VNF, in step 512 it is determined if there is only one VNF for that service. If so, in step 514 that VNF is selected. If more than one VNF is available, in step 516 the administrator specifies any desired optimization factors desired for the various VNFs. In step 518 the possible VNFs are determined in a manner similar to that done in step 316 to select hosts for VNF installation. The specified optimization factors are compared against the hosts of the various VNFs and a VNF list is developed. In step 520 one VNF from the list of VNFs is selected as done in step 318. After step 520 or step 514, control proceeds to step 522 where the orchestration manager 118 executes a constrained shortest path first (CSPF) algorithm using the provided VNFs as constraints. This then is used to determine the service function path (SFP) and/or the rendered service path (RSP), as needed by the SDN controller 120. In step 524 the VNF information and the SFC, SFP and RSP information are provided to the SDN controller 120 to allow the SDN controller 120 to develop and implement the necessary routing. In different embodiments the orchestration manager 118 does not perform the CSPF calculation and simply provides the SFC information and the selected VNFs to the SDN controller 120, which then does the SFP and RSP determinations.

Figure 6A:
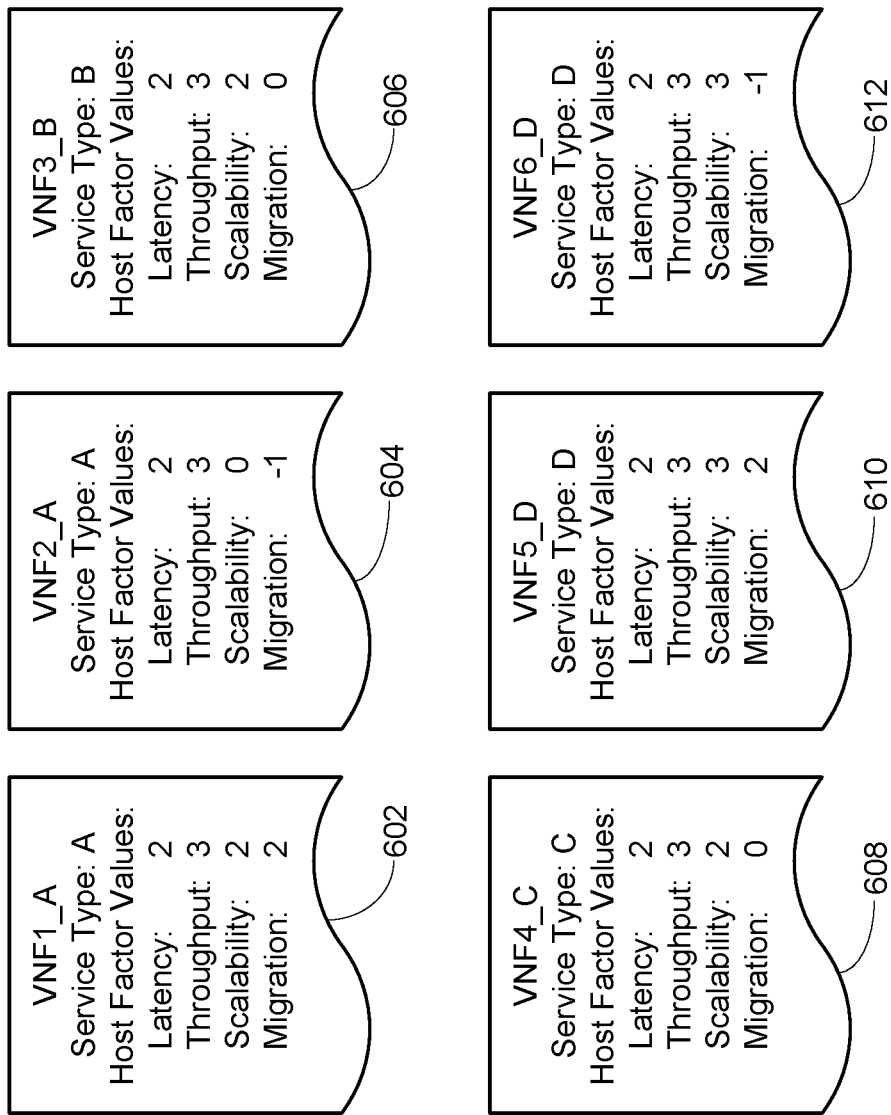
FIG. 6A is an illustration of exemplary VNFs and their host characteristics.

FIG. 6A is a list of six exemplary VNFs to provide an illustration of the operation of FIG. 5. A first VNF 602 is labeled VNF1_A. The VNFx is the VNF identifier. The A indicates the service type, in this case service A. The host that VNF1_A is executing on has characteristics that result in a latency factor value of 2, a throughput value of 3, a scalability value of 2 and a migration value of 2. A second VNF 604 is VNF2_A, a second VNF instance for service type A. The host values for VNF2_A are latency factor value of 2, a throughput value of 3, a scalability value of 0 and a migration value of −1. A third VNF 606 is VNF3_B, the only VNF for service type B. The host values for VNF3_B are latency factor value of 2, a throughput value of 3, a scalability value of 2 and a migration value of 0. A fourth VNF is VNF4_C, the only VNF for service type C. The host values for VNF4_C are latency factor value of 2, a throughput value of 3, a scalability value of 2 and a migration value of 0. A fifth VNF is VNF5_D, one VNF for service type D. The host values for VNF5_D are latency factor value of 2, a throughput value of 3, a scalability value of 3 and a migration value of 2. A sixth VNF is VNF6_D, another VNF for service type D. The host values for VNF6_D are latency factor value of 2, a throughput value of 3, a scalability value of 3 and a migration value of −1.

Referring to FIG. 6B, table 614 represents service chain 1. Three service types are desired, B, A and D, in order. The desired optimization for service type B is latency; for service type A is migration, latency and throughput; and for service type D is scalability. This results in the selection of VNF3_B, VNF1_A and VNF6_D. VNF3_B is selected because it is the only VNF for service type B. VNF1_A is selected over VNF2_A because VNF2_A has a −1 under migration. VNF6_D is selected over VNF5_D because the total of the factor values than scalability is lower for VNF6_D.

Table 616 represents service chain 2. Service chain 2 is services B, A, D and C, in order. For service chain 2, for service type A, only latency and throughput are to be optimized, while for service type D migration has been added to scalability. For service type C, scalability is of interest. This results in the selection of VNF3_B, VNF2_A, VNF5_D and VNF4_C. VNF3_B and VNF4_C are chosen as the only VNFs of their service types. VNF2_A is chosen over VNF1_A because the −1 of migration no longer excludes VNF2_A and VNF2_A has a lower value for the scalability and migration values. VNF5_D is selected over VNF6_D because the inclusion of the migration factor made the −1 value for migration exclude VNF6_D.

Figure 7:
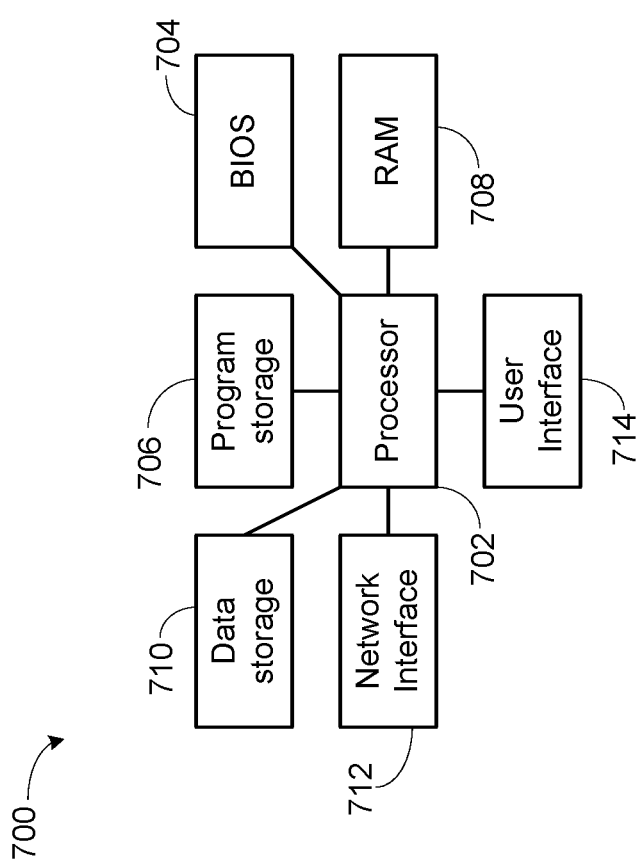
FIG. 7 is a simplified block diagram of a host or manager according to the present invention.

FIG. 7 is a simplified exemplary block diagram of typical computer 700 exemplary of a host, such as host A 106A or a manager computer, such as VNF manager 116 or orchestration manager 118. A processor 702 is the primary computing element in the computer 700. A BIOS 704 is connected to the processor 702 to allow the computer 700 to boot up and perform selected core functions. Program storage 706 is connected to the processor 702 and contains the programs, such as the operating system and applications, such as the hypervisor, the VM code, the VNF manager, VM manager, SDN controller or NVF orchestration manager. The program storage 706 is conventionally a solid state disk (SSD) or hard disk. The programs from the program storage 706 are loaded into RAM 706 connected to the processor 702 for execution by the processor 702. Data storage 710 is connected to the processor 702 and is conventionally a hard disk. Various data processed by the computer 700 is stored in the data storage 710. For example, in the VNF manager 116 the data storage 710 would include the programs for the various VNFs to be deployed to the hosts. In a host 106 the VNF programs would be stored in the program storage 706 as on the host 106 the VNF program is executed by the processor 702 as a VM. But in the VNF manager 116 the VNF programs are data to be provided to the hosts 106 and are not executed by the processor 702 in the VNF manager 116. A network interface 712, typically an Ethernet NIC, is connected to the processor 702 to allow the computer 700 to access the network and other computers. A user interface 714 is connected to the processor 702. The user interface 714 can be a keyboard and display physically attached to the computer 700, as in the clients or the various managers, or can be virtual, allowing headless operation from a different computer over the network, as would be done for the hosts or the SDN controller. This is just a simple explanation of the basic architecture of the computers that form the various hosts and managers in the network. One skilled in the art would be familiar with the many variations that exist for the various computers.

By defining characteristics of interest for VNFs and then evaluating various factors for each characteristic, a host can be readily determined that conforms to the desired environment and maximizes utilizations of the hosts. Similarly, using the characteristics and factors for the VNFs and the hosts allows improved selection of VNF instances to be used in SFCs. Different characteristics and factors can be used, depending on the environment and goals, so that the technique is usable in many different instances.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:
1. A method, comprising:
    determining, by a virtual network function (VNF) operation managing server that manages a VNF, whether a host is being added to a network; and
    in response to determining that the host is being added to the network:
        gathering platform characteristics of the host;
        providing the platform characteristics of the host to a global database;
        determining, for each platform characteristic, a plurality of platform factors used for VNF placement of the host;

analyzing the plurality of platform factors to determine a number of platform factors having positive values and a number of platform factors having negative values;

determining a difference between the plurality of platform factors by subtracting the number of platform factors having negative values from the number of platform factors having positive values;

updating the platform characteristics of the host in the global database based on the determined difference;

gathering, hypervisor characteristics of the host;

providing the hypervisor characteristics of the host to the global database;

determining, for each hypervisor characteristic, a plurality of hypervisor factors used for VNF placement of the host;

analyzing the plurality of hypervisor factors to determine a number of hypervisor factors having positive values and a number of factors having negative values;

determining a difference between the plurality of hypervisor factors by subtracting the number of hypervisor factors having negative values from the number of hypervisor factors having positive values;

updating the hypervisor characteristics of the host in the global database based on the determined difference;

gathering, network characteristics of the host;

providing the network characteristics of the host to the global database;

determining, for each network characteristic, a plurality of network factors used for VNF placement of the host;

analyzing the plurality of network factors to determine a number of network factors having positive values and a number of factors having negative values;

determining a difference between the plurality of network factors by subtracting the number of network factors having negative values from the number of network factors having positive values; and updating the network characteristics of the host in the global database based on the determined difference.

2. The method of claim 1, further comprising:
deploying the VNF to the host.

3. The method of claim 1, further comprising:
indicating inclusion of the VNF and the host into a service function chain (SFC).

4. The method of claim 1, further comprising:
migrating the VNF to the host.

5. The method of claim 1, wherein the platform characteristics are latency reduction, throughput enhancement, scalability enhancement and migration conduciveness.

6. The method of claim 5, wherein
the platform factors include a processor being non-uniform memory access (NUMA), that hyperthreading of the processor has been disabled, the processor being dedicated, presence of a single root I/O virtualization (SR-IOV) network interface card (NIC),
the hypervisor factors include a presence of vhost.net operation, huge pages, a presence of a PCI pass-through card, a use of Data Plane Development Kit (DPDK) and a use of the Quick Emulator (QEMU), and the network factors include a presence of high-speed NIC and a capability to do NIC bonding.

7. A system, comprising:
a processor;
a network interface card communicating with a virtual network function (VNF) manager, a virtual machine (VM) manager and a software defined network (SDN) manager;
memory coupled to the processor and storing executable instructions that cause the processor to:
determine whether a host is being added to a network; and
in response to determining that the host is being added to the network:
gather platform characteristics of the host;
provide the platform characteristics of the host to a global database;
determine, for each platform characteristic, a plurality of platform factors used for VNF placement of the host;
analyze the plurality of platform factors to determine a number of platform factors having positive values and a number of platform factors having negative values;
determine a difference between the plurality of platform factors by subtracting the number of platform factors having negative values from the number of platform factors having positive values;
update the platform characteristics of the host in the global database based on the determined difference;
gather, hypervisor characteristics of the host;
provide the hypervisor characteristics of the host to the global database;
determine, for each hypervisor characteristic, a plurality of hypervisor factors used for VNF placement of the host;
analyze the plurality of hypervisor factors to determine a number of hypervisor factors having positive values and a number of hypervisor number of factors having negative values;
determine a difference between the plurality of hypervisor factors by subtracting the number of hypervisor factors having negative values from the number of hypervisor factors having positive values;
update the hypervisor characteristics of the host in the global database based on the determined difference;
gather, network characteristics of the host;
provide the network characteristics of the host to the global database;
determine, for each network characteristic, a plurality of network factors used for VNF placement of the host;
analyze the plurality of network factors to determine a number of network factors having positive values and a number of network factors having negative values;
determine a difference between the plurality of network factors by subtracting the number of network factors having negative values from the number of network factors having positive values; and
update the network characteristics of the host in the global database based on the determined difference.

8. The system of claim 7, wherein the processor is further configured to deploy the VNF to the host.

9. The system of claim 7, wherein the processor is further configured to indicate inclusion of the VNF and the host into a service function chain (SFC).

10. The system of claim 7, wherein the processor is further configured to migrate the VNF to the host.

11. The system of claim 7, wherein the platform characteristics are latency reduction, throughput enhancement, scalability enhancement and migration conduciveness.

12. The system of claim 7, wherein
the platform factors include a processor being non-uniform memory access (NUMA), that hyperthreading of the processor has been disabled, the processor being dedicated, presence of a single root I/O virtualization (SR-IOV) network interface card (NIC),
the hypervisor factors include a presence of vhost.net operation, huge pages, a presence of a PCI pass-through card, a use of Data Plane Development Kit (DPDK) and a use of the Quick Emulator (QEMU), and
the network factors include a presence of high-speed NIC and a capability to do NIC bonding.

13. A non-transitory storage medium storing computer executable instructions which, when executed by a processor of a virtual network (VNF) operation managing server that manages a VNF, causes the processor to execute a method comprising:
  determining whether a host is being added to a network; and
  in response to determining that the host is being added to the network:
    gathering platform characteristics of the host;
    providing the platform characteristics of the host to a global database;
    determining, for each platform characteristic, a plurality of platform factors used for VNF placement of the host;
    analyzing the plurality of platform factors to determine a number of platform factors having positive values and a number of platform factors having negative values;
    determining a difference between the plurality of platform factors by subtracting the number of platform factors having negative values from the number of platform factors having positive values;
    updating the platform characteristics of the host in the global database based on the determined difference;
    gathering, hypervisor characteristics of the host;
    providing the hypervisor characteristics of the host to the global database;
    determining, for each hypervisor characteristic, a plurality of hypervisor factors used for VNF placement of the host;
    analyzing the plurality of hypervisor factors to determine a number of hypervisor factors having positive values and a number of factors having negative values;
    determining a difference between the plurality of hypervisor factors by subtracting the number of hypervisor factors having negative values from the number of hypervisor factors having positive values;
    updating the hypervisor characteristics of the host in the global database based on the determined difference;
    gathering, network characteristics of the host;
    providing the network characteristics of the host to the global database;
    determining, for each network characteristic, a plurality of network factors used for VNF placement of the host;
    analyzing the plurality of network factors to determine a number of network factors having positive values and a number of factors having negative values;
    determining a difference between the plurality of network factors by subtracting the number of network factors having negative values from the number of network factors having positive values; and
    updating the network characteristics of the host in the global database based on the determined difference.

14. The non-transitory storage medium of claim 13, wherein the method further comprises:
  deploying the VNF to the host.

15. The non-transitory storage medium of claim 13, wherein the method further comprises:
  indicating inclusion of the VNF and the host into a service function chain (SFC).

16. The non-transitory storage medium of claim 13, wherein the method further comprises:
  migrating the VNF to the host.

17. The non-transitory storage medium of claim 13, wherein the platform characteristics are latency reduction, throughput enhancement, scalability enhancement and migration conduciveness.

18. The non-transitory storage medium of claim 13, wherein
the platform factors include a processor being non-uniform memory access (NUMA), that hyperthreading of the processor has been disabled, the processor being dedicated, presence of a single root I/O virtualization (SR-IOV) network interface card (NIC),
the hypervisor factors include a presence of vhost.net operation, huge pages, a presence of a PCI pass-through card, a use of Data Plane Development Kit (DPDK) and a use of the Quick Emulator (QEMU), and
the network factors include a presence of high-speed NIC and a capability to do NIC bonding.

* * * * *